(12) United States Patent
Saija

(10) Patent No.: US 10,581,248 B2
(45) Date of Patent: Mar. 3, 2020

(54) METHODS AND APPARATUSES FOR A MICROGRID NETWORK

(71) Applicant: Telia Company AB, Solna (SE)

(72) Inventor: Timo Saija, Espoo (FI)

(73) Assignee: Telia Company AB, Solna (SE)

( * ) Notice: Subject to any disclaimer, the term of this patent is extended or adjusted under 35 U.S.C. 154(b) by 120 days.

(21) Appl. No.: 15/922,528

(22) Filed: Mar. 15, 2018

(65) Prior Publication Data

US 2018/0269683 A1    Sep. 20, 2018

(30) Foreign Application Priority Data

Mar. 17, 2017   (EP) .................................... 17161662

(51) Int. Cl.
| | | |
|---|---|---|
| G05B 15/02 | (2006.01) | |
| H02J 3/28 | (2006.01) | |
| H02J 13/00 | (2006.01) | |
| H02J 3/00 | (2006.01) | |
| H02J 3/12 | (2006.01) | |
| H02J 3/38 | (2006.01) | |

(52) U.S. Cl.
CPC ................ *H02J 3/28* (2013.01); *G05B 15/02* (2013.01); *H02J 3/00* (2013.01); *H02J 3/12* (2013.01); *H02J 3/381* (2013.01); *H02J 13/0006* (2013.01); *G05B 2219/32021* (2013.01)

(58) Field of Classification Search
CPC ...... H02J 3/28; H02J 3/381; H02J 3/12; H02J 13/0006; H02J 3/00; G05B 15/02; G05B 2219/32021
See application file for complete search history.

(56) References Cited

U.S. PATENT DOCUMENTS

| | | | |
|---|---|---|---|
| 7,373,222 B1* | 5/2008 | Wright | H02J 3/14 |
| | | | 700/20 |
| 9,455,577 B2 | 9/2016 | Bhageria et al. | |
| 9,535,481 B2 | 1/2017 | Vaum et al. | |
| 2004/0024494 A1* | 2/2004 | Bayoumi | H02J 13/0062 |
| | | | 13/62 |

(Continued)

FOREIGN PATENT DOCUMENTS

WO    WO 2015/113637 A1    8/2015

OTHER PUBLICATIONS

European Search Report, App. No. 17161662.6-1804, dated May 31, 2017, pp. 1-10, European Patent Office, Munich, Germany.

*Primary Examiner* — Christopher E. Everett
(74) *Attorney, Agent, or Firm* — Burr & Forman LLP; Jeffrey H. Kamenetsky

(57) ABSTRACT

The embodiments herein relate to methods and apparatus for controlling a microgrid network. The microgrid comprises an energy negotiation resolution system configured to receive from each energy consuming component of the microgrid a list with information on power supply/production units; determine whether there is a conflict in priorities between received lists with regards to the listed energy production units, based on requests received from each energy consuming components; resolve the conflict when there is a conflict in priorities; and inform each energy consuming component involved in the conflict of the energy production unit to use as energy source. The embodiments also relate to the energy consuming component and a method therein.

10 Claims, 6 Drawing Sheets

(56) References Cited

U.S. PATENT DOCUMENTS

| | | | |
|---|---|---|---|
| 2010/0204851 A1* | 8/2010 | Yuen | H02J 3/06 |
| | | | 700/297 |
| 2013/0238150 A1 | 9/2013 | Vaum et al. | |
| 2015/0032278 A1 | 1/2015 | Bhageria et al. | |
| 2016/0092986 A1* | 3/2016 | Lian | G06Q 30/08 |
| | | | 700/295 |
| 2017/0102726 A1* | 4/2017 | Goldsmith | G06Q 50/06 |
| 2017/0176965 A1 | 6/2017 | Martin Lloret et al. | |

* cited by examiner

METHODS AND APPARATUSES FOR A MICROGRID NETWORK

TECHNICAL FIELD

The present disclosure generally relates to microgrid systems and more particularly to methods and apparatuses for controlling a microgrid network.

BACKGROUND

A microgrid is a semiautonomous grouping of distributed energy production supply units, energy storage units and loads within a local area. The loads may be energy consuming/consumption units, a grouping of several sites, or dispersed sites that operate in a coordinated fashion. The production supply units may include generators, wind turbines, fuel cells, photovoltaic/solar, and other small-scale renewable generators. All controllable supply units, storage units and consuming units are interconnected in a manner that enables devices to perform certain microgrid control functions. An energy consuming/consumption unit/component can for instance be a household equipment and utilities, e.g., a fridge, freeze, TV, oven, heating system, washing machine etc. An example of an energy storage unit is a battery. Microgrids may supply power to shopping centers, college campuses, and/or residential areas, for example.

A solar home system may be viewed as a microgrid. Such a system will operate until the battery is discharged and then turn off. However, from the perspective of the end user, not all devices are created equal. For example, access to a small amount of light may be more important than an extra few minutes of phone charging. The distribution of power may therefore be considered unfair in some situation. It is therefore desirable to have some form of power management to provide needed power in a microgrid and in a controlled manner. It is also desirable to minimize acquired and/or purchased energy from an energy grid or macrogrid. A macrogrid is a centralized grid such as a national grid, a regional distribution network and/or transmission distribution network.

SUMMARY

It is an object of some embodiments herein to solve the above problems by providing an energy negotiation resolution system for a microgrid and a method thereof for resolving conflicts in a microgrid. Another object of some embodiments herein is to provide an energy consuming component that can act as active autonomous initiator of the energy negotiation system. There is also provided a method performed by the energy consuming component.

According to an aspect of some embodiments herein, there is provided an energy negotiation resolution system connected to a microgrid network comprising a plurality of energy consuming components and a plurality of energy production units, and wherein each energy consuming component is provided with an own list comprising priority information on at least energy production units from which energy can be requested. The energy negotiation resolution system being configured to: receive from each energy consuming component the list; determine whether there is a conflict in priorities between received lists with regards to the listed energy production units, based on requests received from the energy consuming components; resolve the conflict when there is a conflict in priorities; and inform each energy consuming component involved in the conflict of the energy production unit to use as energy source.

According to another aspect of some embodiments herein, there is provided an energy consuming component comprised in a microgrid network including a plurality of energy consuming components, wherein each energy consuming component is provided with a list comprising information on energy production units from which energy can be requested, the energy consuming component comprising at least one energy sensing module configured to: sense own available energy status to determine currently available energy level; sense energy threshold level, i.e., the buffer energy level to safeguard continuous operation; determine available time for continuous operation. The energy consuming component is further configured to send an energy request according to the priority list in the event sensed available energy is determined not to be enough, and if no energy production unit is available from the energy production units or from own energy production unit, to send an energy request to an energy grid or to an Uninterruptible Power Source (UPS).

According to another aspect of some embodiments herein there is provided a method performed by an energy negotiation resolution system connected to a microgrid network comprising a plurality of energy consuming components and a plurality of energy production units, and wherein each energy consuming component is provided with an own list comprising priority information on at least energy production units from which energy can be requested, the method comprising: receiving from each energy consuming component the list; determining whether there is a conflict in priorities between received lists with regards to the listed energy production units, based on requests received from the energy consuming components; resolving said conflict when there is a conflict in priorities; and informing each energy consuming component involved in said conflict of the energy production unit to use as energy source According to another aspect of some embodiments herein there is provided a method performed by an energy consuming component comprised in a microgrid network including a plurality of energy consuming components and a plurality of energy production units, wherein each energy consuming component is provided with an own list comprising priority information on energy production units from which energy can be requested, the energy consuming component comprising at least one energy sensing module, the method comprising: sensing own available energy status to determine currently available energy level; sensing energy threshold level, i.e., the buffer energy level to safeguard continuous operation; determining available time for continuous operation; sending an energy request according to the priority list in the event sensed available energy is determined not to be enough, and if no energy is available from the energy production units or from own energy production unit, sending an energy request to an energy grid or to a UPS.

An advantage with embodiments herein is to minimize acquired and/or purchased energy from an energy grid or macrogrid. The energy grid may act as a fallback default network only.

Another advantage is to maximize energy power consumption of individual units or components in the microgrid.

Another advantage is creation of autonomous demand-driven energy requesting system, based on independent energy consumption components, which can be formed as an isolated self-servicing and self-supplying grid.

Another advantage is to resolve conflicts based on energy supply priorities.

BRIEF DESCRIPTION OF THE DRAWINGS

Example of embodiments herein are described in more detail with reference to attached drawings in which.

DETAILED DESCRIPTION

In the following, a detailed description of the exemplary embodiments is presented in conjunction with the drawings to enable easier understanding of the solutions(s) described herein.

The following abbreviations are used:
ENS ENergy Storage
ENNRS ENergy Negotiation Resolution System
ENCU ENergy Consuming or Consumption Unit
ENPSU ENergy Production Supply Unit
EN_GRID ENergy Grid
UPS Uninterruptible Power Source Referring to FIG. 1, there is illustrated a schematic overview or topology including a microgrid network 100, an energy grid (EN_GRID) 150, an energy negotiation resolution system (ENNRS) 110, and an energy storage unit (ENS) 140. The microgrid 100 includes a plurality of energy consuming or consumption units/components (ENCU) 120 and a plurality of energy production supply units (ENPSU) 130. The topology is also shown including a UPS, which is optional.

Dashed lines between the different blocks illustrate a communication link which may be wire line or wireless link, and straight lines illustrate energy link, e.g., electricity wiring. The communication links are used to send and receive information, e.g., sending requests for energy supply and/or sending information on the energy status or receiving sensor information detected by a device.

As shown, the ENNRS 110 communicates with the ENCUs 120 and the ENPSUs 130 via the communication link. The radio access technology used for wireless communication may include standardized third Generation Partnership Project (3GPP) technologies such as GSM, 3G, LTE, 5G, or WiMax, WiFi or WLAN or any type of wireless access technology.

Figure 2:
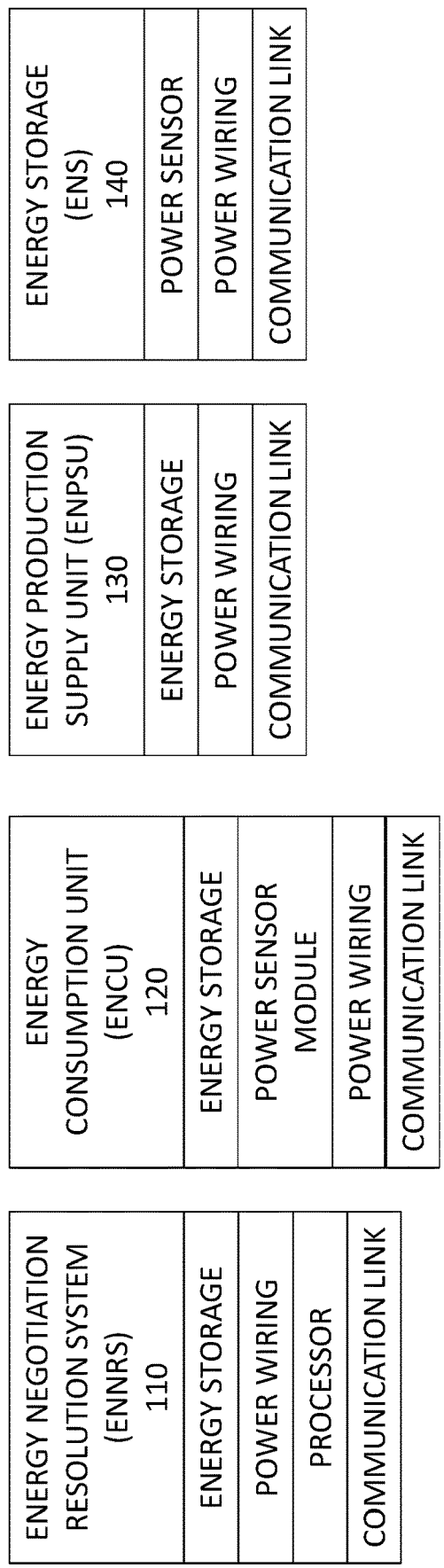
FIG. 2 illustrates the components or units of FIG. 1.

As previously described, the ENCUs or energy consuming components 120 may be household equipments and utilities (fridges, ovens, freezers, TVs, etc.), each and every one of them being provided with energy storage, battery monitoring sensor, communication sensor, power wiring, power sensor and communication capabilities ((Internet Protocol) IP address) (see FIG. 2).

The ENPSUs 130 may be solar panel(s) (photovoltaic cells), wind turbine(s), generators, wind turbines, fuel cells, photovoltaic/solar, and other small-scale renewable generators. Similarly to the ENCUs 120, an ENPSU 130 is equipped with dedicated power consumption, battery monitoring senor(s), power wiring, communication capabilities (IP address) etc. (see FIG. 2).

The ENS 140 may be an external battery providing energy storage which can be connected to the ENCUs 120 and to the ENPSUs 130 as well as the EN_GRID 150 and to the UPS. One ENS 140 per consuming component 120 may be provided, e.g., one battery capacity for fridge, one for TV, one for PC, etc. The ENS 140 may be attached directly, i.e., physically to the household equipment or ENCU 120 or centralized but gadget dedicated, i.e., virtual "chunk" of battery capacity assigned to the equipment. The ENS 140 may include power sensor, power wiring and communication link capabilities (see FIG. 2).

Figure 1:
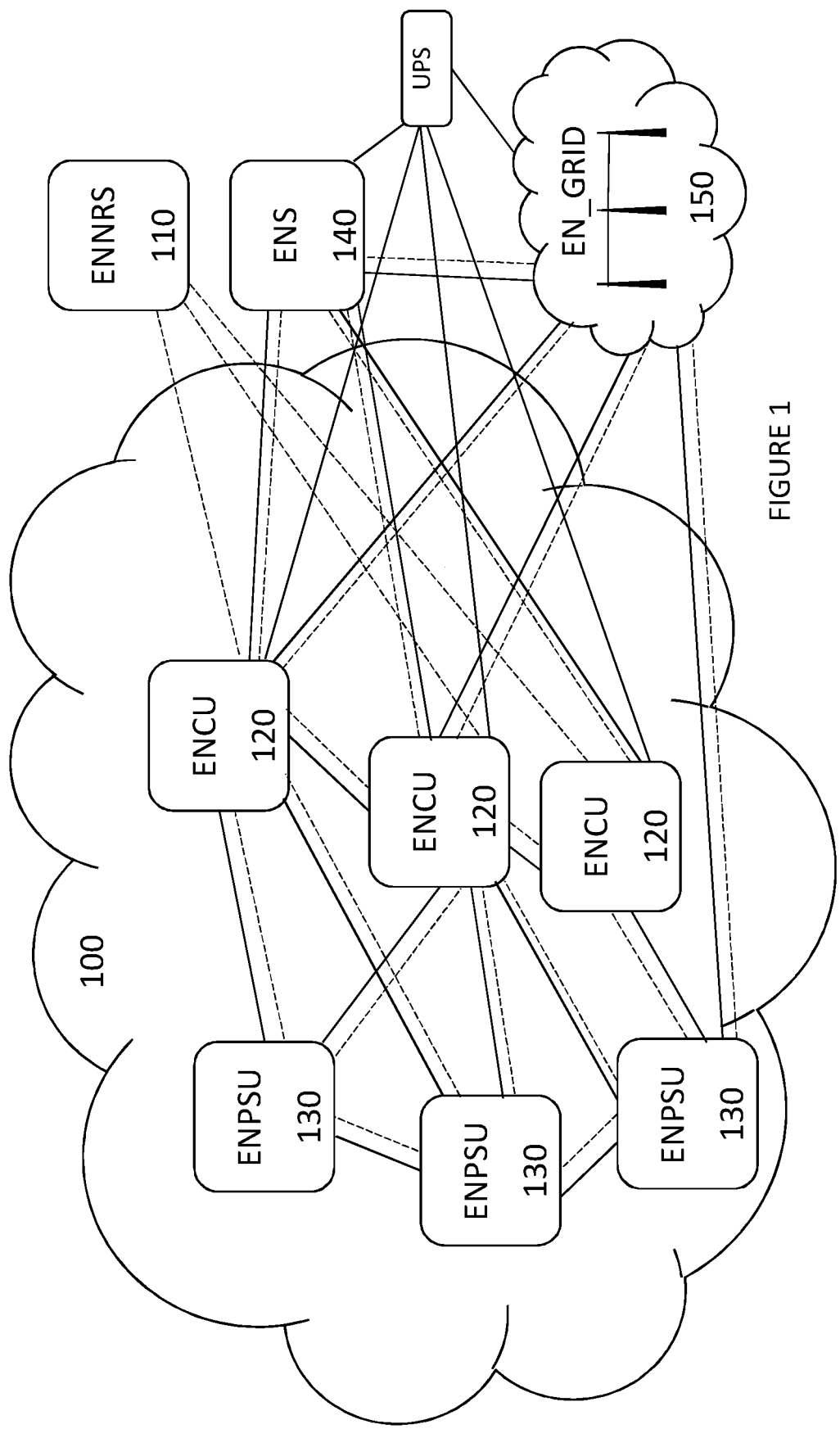
FIG. 1 illustrates a schematic overview or topology including a microgrid, wherein embodiments herein may be applied.

The ENS 140 may be included in the microgrid 100 or be external to the microgrid 100. As mentioned above, one ENS 140 may be provided per ENCU 120. The ENS 140 may also comprise a set of energy storage units or batteries in a centralized manner within the microgrid. In other words, the ENS 140 may be extended with a set of batteries which can be shared among the ENCUs 120 within the microgrid 100, thereby increasing the energy storage capacity within the microgrid 100. Thus, an ENCU 120 does not need to use its own energy source i.e. own energy battery. This is especially advantageous for older consuming components provided with own low/reduced capacity battery since they can remain operational and used longer, in a more sustainable way, if they are instead connected to a centralized ENS 140 having a set of batteries. There is also no need to replace an ENCU's old battery when it capacity deteriorates. The ENS 140 may therefore be viewed as an ENCU's 120 own energy source. FIG. 1 illustrates this scenario where ENS 140 is connected to each ENCU 120 of the microgrid 100.

The ENNRS 110 which can be an external database, an application on a platform, a mobile device with computing capability, such as a processor, and eventually also with energy storage (battery) capabilities and power wiring also include communication link capabilities (see FIG. 2). The ENNRS 110 is connected to the microgrid 100, as shown in FIG. 1, in order to provide conflict resolution based on energy supply priorities as will be described.

The EN_GRID 150 is the traditional electricity network used for energy supply. This grid 150 may be connected to a plurality of microgrids such as microgrid network 100 and to the UPS. It is here assumed that the units and components disclosed herein are provided with switches and circuit switching (switches, circuit breakers etc.) to enable provisioning of energy on request, DC/AC conversions/converters when necessary, fault monitoring and environmental sensing (sensors) etc. Also the energy storage components as well as the energy production units and energy consumption units can exist in a centralized (physical as well as cloud-based) or in a distributed manner in the network topology.

According to the present invention, an ENCU 120 is configured to act as active autonomous initiator of the energy negotiator 110. Such an ENCU acts as active component, sensing the electricity status and acquiring or requesting (chunk of) energy from the microgrid or providing its own energy to the microgrid network. As an example, such a component 120 can measure and follow ambient and local circumstances (temperature, power, climate conditions etc.) and store own consumption or usage patterns configuration of each component residing in the component itself.

According to an embodiment, each ENCU 120 in the microgrid network 100 is configured to have energy priority souring (list) setup that defines the priority order of energy sourcing i.e. from where energy/electricity shall be acquired when needed. Such a configuration may comprise the priority order of energy requests according to the following list:

Own energy storage unit, i.e., the component 120 itself souring the energy from the own battery;

Energy production unit(s), ENPSU 130 to which the component 120 is connected. For example as shown in FIG. 1, one ENCU 120 may be simultaneously connected to three ENPSUs 130 (e.g. solar panel, wind turbine, generator etc.);

Other ENCUs 120, i.e., the component requests energy from other components 120;

External storage unit or battery(ies) (ENS (140)).

EN_GRID 150;

UPS.

It should be mentioned that the EN_GRID 150 or the UPS acts as an energy provider of the last resort so in case no adequate amount of energy capacity is available, EN_GRID 150 or UPS is requested for energy. Further, the number of ENCUs, ENS, ENPSUs, etc., can take any value depending on the size of the microgrid.

The ENCU 120 having the energy priority setup configuration defines whether or not this particular component has, for its own energy, higher consumption priority than other adjacent similar components. As an example, in case the priority for another ENCU is higher, then, this particular ENCU 120 is in energy provisioning mode to the ambient surrounding network components.

Note that in this disclosure, an ENCU 120 acting as an energy source for another ENCU may be viewed as an energy production supply unit similar to ENPSU 130. The same applies when the energy storage (ENS) 140 is the supplier of energy, i.e., ENS 140 acts as an ENPSU 130.

As previously described, the ENCU 120 is provided with at least one power sensor module for enabling the ENCU 120 to sense its available energy status to determine currently available energy level, with the aim of safeguarding continuous operation, knowing available time for continuous operation and knowing manageability frame such as allowed time and resources to set energy consumption levels lower, initiate energy safe mode or shutting down the component in a safe manner.

Several parameters may therefore be taken into consideration by an energy consuming component 120 and which include:

Energy sensing frequency including reading priorities and energy status parameters as well as sending energy requests and receiving energy/electricity from the supply instances Energy level currently available Energy level required to run operationally a particular ENCU Time span available and remaining to run operationally a particular ENCU Energy threshold level, i.e., the buffer energy level to safeguard continuous operation of a particular ENCU Time threshold level, i.e., buffer time to safeguard continuous operation of a particular ENCU Environmental detectors, such as overheating, freezing and short-circuit detectors etc.

Based on and derived from the above (sensor-) detected environmental data and settings, energy/electricity requests are sent to other energy units with energy storage with defined priorities. This sensing process continues until adequate energy/electricity is detected for the requesting unit to continue operation. The last energy providing resort may be the energy grid 150 or the UPS. This means a fallback setup in which a microgrid network does not operate anymore in a self-supplying island model but receives energy as traditionally from the macrogrid 150 or UPS.

As previously described and according to some embodiments herein, the ENCU 120 is provided with an own list comprising priority information on at least energy production units from which energy can be requested. The ENCU 120 being configured: to sense own available energy status to determine currently available energy level; to sense energy threshold level, i.e., the buffer energy level to safeguard continuous operation; to determine available time for continuous operation; and to send an energy request according to the priority list in the event sensed available energy is determined not to be enough, and if no energy is available from the energy production units or from own energy production unit, to send an energy request to an energy grid or to the UPS.

According to an embodiment, if energy is available at a requested energy production unit indicated in the priority list but the requested energy production unit is unable to provide energy, the ENCU 120 is configured to send a request to the energy negotiation resolution system (ENNRS) 110 for resolving a priority conflict; and to receive from the ENNRS 110 information indicating which energy production supply unit to use as energy source.

It should be noted that the ENNRS 110 may decide based on its energy supply overall priorities that less energy for a certain ENCU 120 can be considered adequate, e.g., to maintain self-supplying island model.

A conflict may occur when there are two or more requests arriving to energy production units or to another energy consuming component or to energy storage and/or to the ENNRS from different ENCUs so that their priorities on requests are identical, i.e., same priority to submit energy to more than one ENCU. The energy production unit or the energy consuming component or the energy storage unit when receiving these requests will treat them equally and if the conflict is not resolved, the requests are sent the ENNRS for resolving the conflict. The ENNRS is thus configured to determine whether there is a conflict in priorities when the requests from two or more ENCUs are identical in that the priority lists of the ENCUs involved in the conflict are similar.

According to some embodiments herein, the ENNRS 110 is configured to receive from each ENCU 120 the priority list of the ENCU 120; to determine whether there is a conflict in priorities between the received lists with regards to the listed energy production units; resolve the conflict and inform each ENCU involved in the conflict of the energy production unit to use as energy source.

The ENNRS 110 may resolve the conflict using different methods, for example:

FIFO principle: In this case, the ENNRS 110 resolves the conflict based on the First In First Out principle, i.e., the first energy resolution request coming from an ENCU shall be served first and this ENCU is informed of the energy source to use according to the priority list.

Timebox principle: In this case, the ENNRS 110 resolves the conflict time-wise with equal priority. This means that within a certain predetermined time period, the energy resolution requests with conflicting priorities will be treated within that said set timebox period, time-wise equal priority so that requests are collected and temporarily stored for request prioritization, then taking into consideration the set energy supply overall priority.

The ENNRS 110 may resolve the conflict by overriding conflicting priorities and informing each ENCU involved in the conflict to use currently available own production energy unit as energy supply.

LIFO principle: In this case and contrary to the FIFO principle described above, the ENNRS 110 resolves the conflict based on the Last In First Out principle, so that the last request collected within a certain timebox period is served first.

It should be mentioned that the ENNRS 110 is not restricted to resolve conflict using only the above methods. For example, the ENNRS 110 may resolve a conflict using:

Any mathematical game-theory or other negotiation model logic. This can be described in a generic manner of handling incoming N energy resolutions requests within a certain period of time where N is larger than or equal to two. These requests being compared at the time of comparison with content of conflicting priorities from 2 devices or components, and comparing these requests pair-wise one after another with ENNRS's corresponding set of priorities for all the M devices or components within the microgrid 100 (where N<=M within a certain time span (i.e., N×2×M three-dimensional matrix). The Setup has as an engine a dynamically updated prioritization decision matrix that is theoretically based on mathematical models such as:

Nash Equilibrium (overall win-win): within a certain time period of time, there are N competing resolution requests submitted for conflict resolution at the ENNRS 110, where the ENNRS 110 defines the best win-win overall optimizing strategy for all M devices or components of the microgrid out of different priorities for microgrid's energy provisioning.

Stackelberg game: within a certain period of time, out of the received resolution requests, the ENNRS 110 defines the leader request and follower requests, so determining the priority order for request handling. Follower requests are served following the priority orders defined.

Stochastic outcomes: Stochastic probabilistic provisioning of energy to the ENCUs. This means that no guarantees are given to any of the ENCUs. Instead, energy provisioning quantity is decided randomly by the ENNRS 110 "on-the-fly".

Any other applicable priority setting logic to handle conflicting priorities in resolution requests within a certain period of time.

Figure 3:
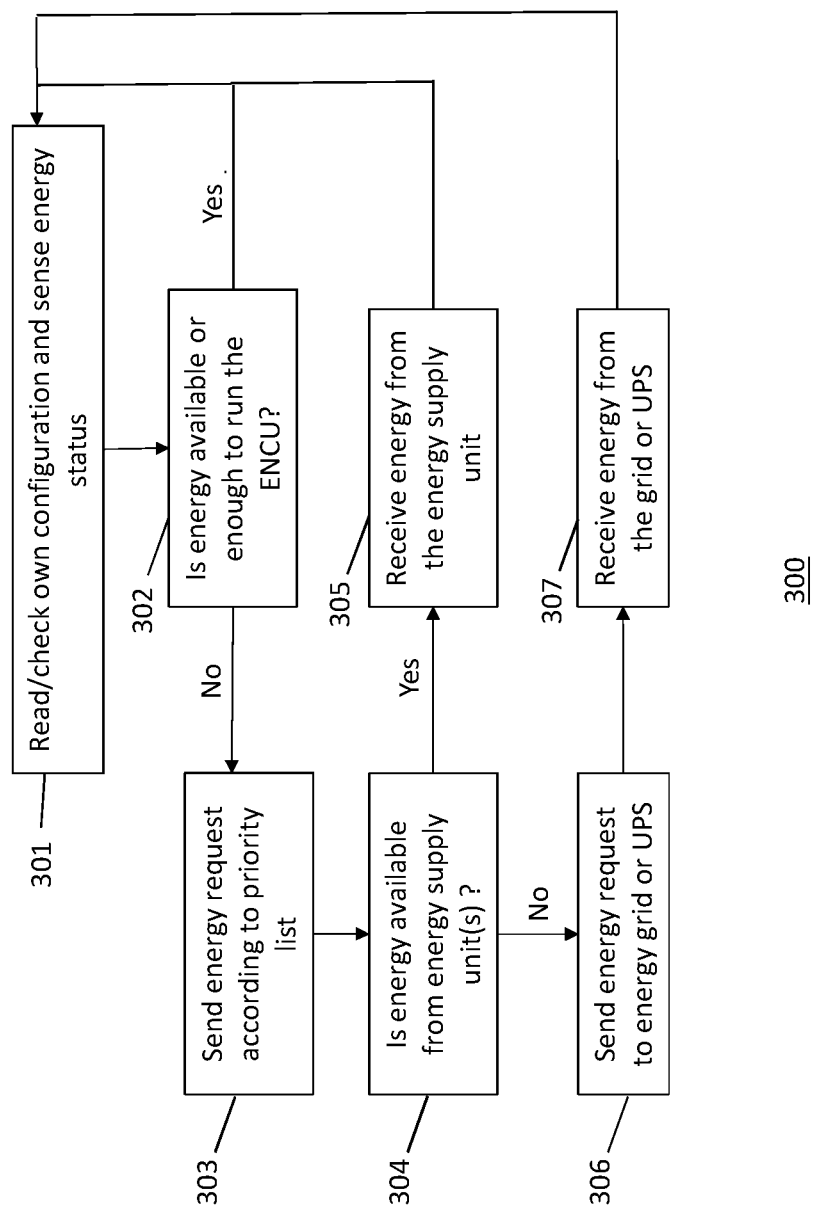
FIG. 3 is an example scenario illustrating an energy acquisition operation cycle according to an embodiment herein.

Referring to FIG. 3, there is illustrated an energy acquisition operation cycle 300 performed by an ENCU 120 according to an exemplary embodiment of the present invention.

In 301, the ENCU is configured to read or check own configuration i.e. energy consumption and supply priority indication. The ENCU is also configured to sense energy status, e.g., if adequate energy/power capacity is available to run the ENCU as shown is action 302. Here it is assumed that every unit in the microgrid network has its own threshold level guaranteeing its own operation. The ENCU is also configured to determine available time for continuous operation. Once energy status falls below the threshold, the status equals "no energy available" or "not enough" and the unit or component goes into energy acquisition mode i.e. sending energy request to ambient units in the microgrid as described below. The threshold is a design parameter e.g. 40% of available power level or 50% or 30% or 70% etc. The threshold level may also depend on the type of ENCU present in the microgrid. In other words, a threshold level may be set individually depending on the ENCU present in the microgrid.

As previously described the ENCU is configured with a priority list of devices or units from which energy may be acquired including own battery; external battery (ENS), other ENPSUs, other ENCUs, EN_GRID, UPS, etc.

If the energy is available or is enough to run the ENCU, the ENCU continues to monitor it status, i.e., reading own configuration and sensing energy status.

If the own energy is not enough, a request for energy/electricity supply is sent according to the priority list 303. Such a request is sent along the communication link. The link may be wireless link or wireline link.

Hence, it is checked if energy is available from an energy supply unit 304. For example, the first supply unit indicated in the list is requested and if no energy can be acquired from it, the supply unit (e.g., ENPSU or ENCU or ENS) indicated second in the list is requested etc.

If a supply unit responds in the positive, energy or electricity is acquired/received from the supply unit 305. But if none of the listed units can provide energy to the requesting ENCU, a request is sent to the energy grid or to the UPS 306, and therefrom energy is acquired/received 307. Hence in this case, the microgrid network does not operate in self-supplying mode but receives energy in a traditional way.

Figure 4:
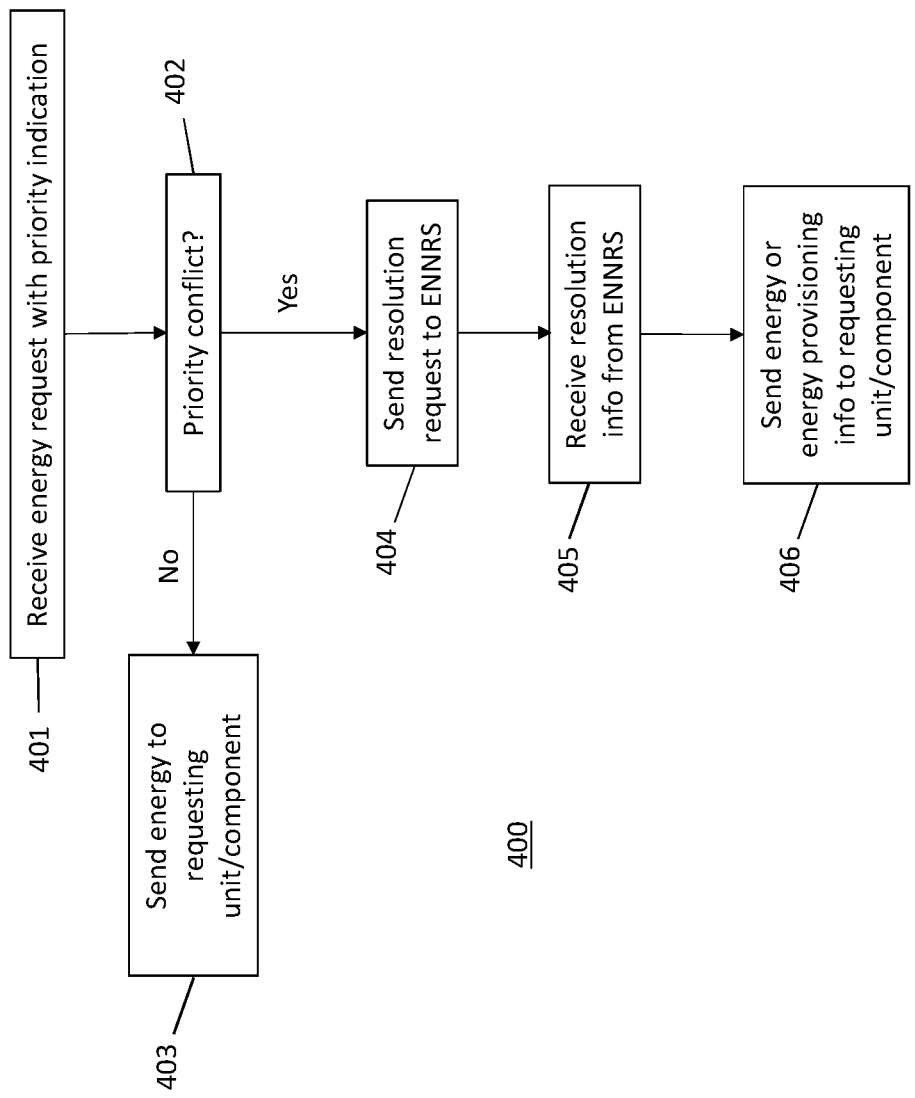
FIG. 4 is an example scenario illustrating a method involving the energy negotiation resolution system according to another embodiment herein.

Referring to FIG. 4, there is illustrated an example 400 wherein the energy negotiation resolution system ENNRS is involved.

A request for energy including priority indication is received at an ENCU or an ENPSU 401. If a priority conflict occurs 402, a request for conflict resolution is sent to the ENNRS 404. If there is no conflict energy is supplied to the requesting unit/component 403. From the ENNRS, conflict resolution information is received 405. The information from ENNRS indicates to the unit to send energy (along electricity wiring) to the requesting unit/component or to provide additional information (along communication link) to the requesting unit 406, for example, information on the supply unit to use for acquiring energy. How a conflict may occur and how it is resolved have already been described and need not be repeated again.

Figure 5:
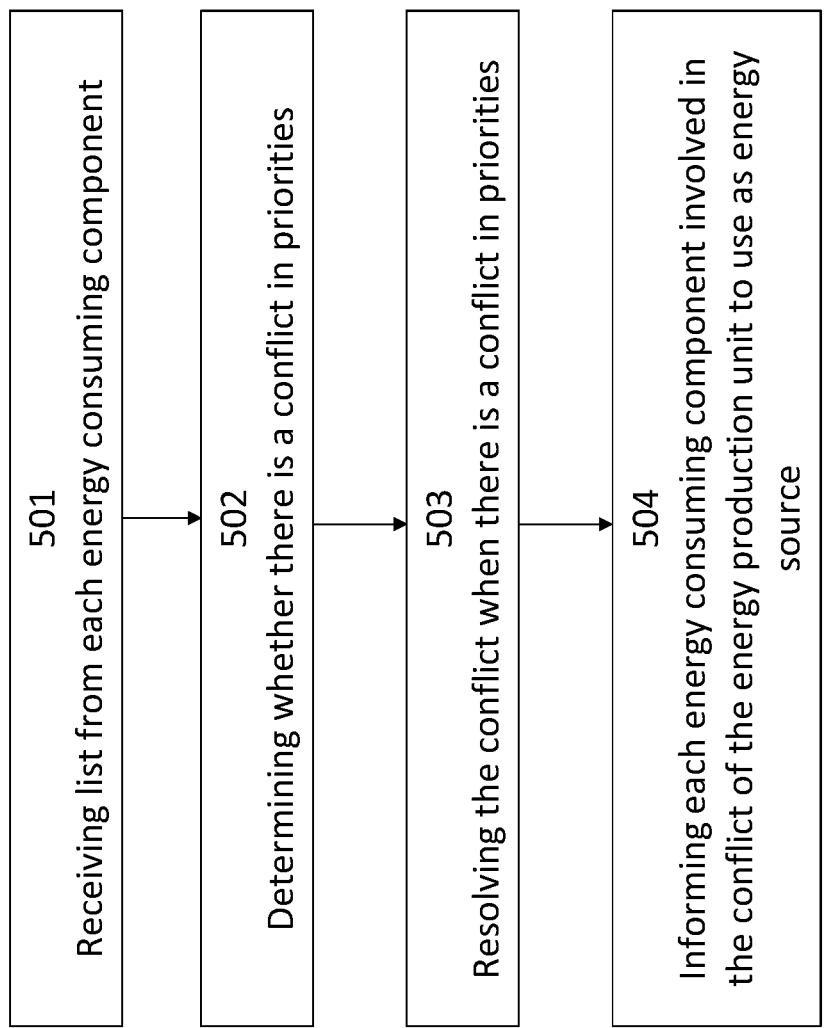
FIG. 5 illustrates a flowchart of a method performed by an energy negotiation resolution system according to some embodiments herein.

Referring to FIG. 5, there is illustrated the main steps of a method performed by the ENNRS 110 according to embodiments herein. The method comprises:

(501) receiving from each energy consuming unit (ENCU) the (own) list comprising information on at least energy production units from which energy can be requested. Note here that an energy production unit may be the ENPSU 130, the ENCU 120 (if acting as supplier) or the ENS 140. The list may also contain information on the EN_GRID 150 and the UPS;

(502) determining whether there is a conflict in priorities between received lists with regards to the listed energy production units, based on requests received from each ENCU 120;

(503) resolving the conflict when there is a conflict in priorities; and (504) informing each ENCU 120 involved in the conflict of the energy production unit to use as energy source.

According to an embodiment, resolving of the conflict is performed according to a FIFO principle or is performed time-wise with equal priority or is performed by overriding conflicting priorities and informing each ENCU involved in the conflict to use currently available own production energy unit as energy supply.

According to an embodiment, determining whether there is a conflict in priorities comprises determining when the requests from two or more ENCUs 120 are identical in that the priority lists of the ENCUs involved in the conflict are similar.

Figure 6:
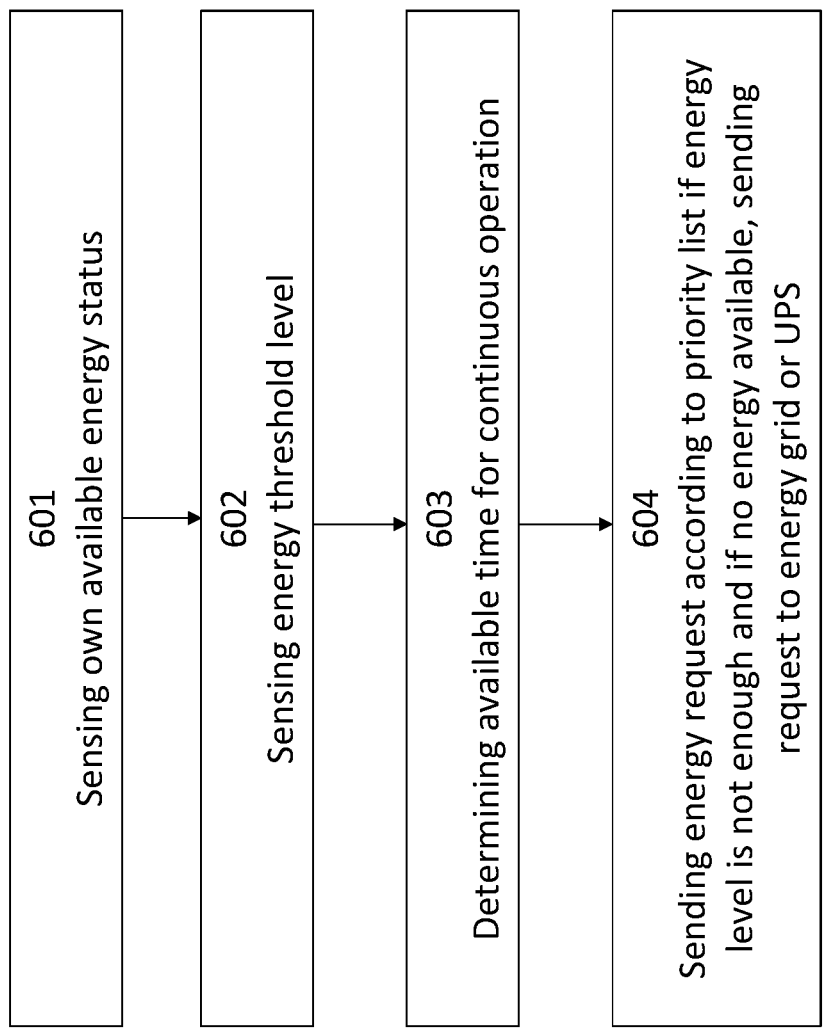
FIG. 6 illustrates a flowchart of a method performed by an energy consuming unit/component according to some embodiments herein.

Referring to FIG. 6, there is illustrated the main steps of a method performed by ENCU 120 according to embodiments herein. Each ENCU 120 being provided with an own (priority) list comprising priority information on at least energy production units from which energy can be requested. The priority list includes information on at least:
  own energy storage unit, e.g., own battery;
  energy production units (e.g., ENPSUs);
  other energy consuming components (other ENCUs);
  external energy storage or battery(ies) (ENS);
  electricity grid (EN_GRID);
  UPS.

As depicted, the method comprises:
(601) sensing own available energy status to determine currently available energy level;
(602) sensing energy threshold level, i.e., the buffer energy level to safeguard continuous operation;
(603) determining available time for continuous operation;
(604) sending an energy request according to the priority list in the event sensed available energy is determined not to be enough, and if no energy is available from the energy production units 130, 120, 140 or from own energy production unit, sending an energy request to the energy grid 150 or to the UPS. Note that sensing own available energy status may be interpreted as sensing energy status of own battery of the ENCU 120 or sensing energy status of the ENS 140 to which the ENCU 120 is connected when the ENS 140 (extended with a plurality of batteries) is connected to the ENCU 120 as previously described.

If energy is available at the requested energy production unit 130, 120, 140 or own battery indicated in the list but the requested energy production unit is unable to provide energy, the method comprises, sending a request to the ENNRS 110 for resolving a priority conflict; and receiving from the ENNRS 110 information indicating which energy production unit 130, 120, 140, to use as energy source.

There is also provided a computer program comprising instructions which when executed on at least one processor of the ENNRS according to embodiments herein and as disclosed in claims 1-5, cause the at least one processor of the ENNRS to carry out the method previously described and disclosed in claims 10-14. Also a carrier containing the computer program is provided, wherein the carrier is one of a computer readable storage medium; an electronic signal, optical signal or a radio signal. The computer program may be in the form of an application that is downloadable and executable by the processor of the ENNRS.

The previously described embodiments of the present invention have several advantages. An advantage is to minimize acquired and/or purchased energy from an energy grid or macrogrid. The energy grid may act as a fallback default network only. Another advantage is to maximize energy power consumption of individual units or component in the microgrid. Another advantage is creation of autonomous demand-driven energy requesting system, based on independent energy consumption components, which can be formed as an isolated self-servicing and self-supplying grid. Another advantage is to resolve conflicts based on energy supply list priorities.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation.

The invention claimed is:

1. An energy negotiation resolution system connected to a microgrid network comprising a plurality of energy consuming components and a plurality of energy production units, and wherein each of the plurality of energy consuming components is provided with an own list comprising priority information on at least energy production units from which energy can be requested, the energy negotiation resolution system being configured to:
  receive from each of the plurality of energy consuming components, the list;
  determine whether there is a conflict in priorities between received lists with regards to the listed energy production units, based on requests received from each of the plurality of energy consuming components;
  resolve said conflict when there is a conflict in priorities; and
  send resolution information to each of the plurality of energy consuming components involved in said conflict of the energy production unit to use as an energy source, wherein the resolution information enables each of the plurality of energy consuming components to request energy from the energy production unit as the energy source.

2. The energy negotiation resolution system according to claim 1, wherein resolving said conflict includes resolving said conflict according to a first in first out principle.

3. The energy negotiation resolution system according to claim 1, wherein resolving said conflict includes resolving said conflict time-wise with equal priority.

4. The energy negotiation resolution system according to claim 1, wherein resolving said conflict includes resolving said conflict by overriding conflicting priorities and informing each of the plurality of energy consuming components involved in the conflict to use currently available own production energy units as an energy supply.

5. The energy negotiation resolution system according to claim 1, further comprising determining whether there is a conflict in priorities when the requests from two or more energy consuming components are identical in that the priority lists of the energy consuming components involved in the conflict are similar.

6. A method performed by an energy negotiation resolution system connected to a microgrid network comprising a plurality of energy consuming components and a plurality of energy production units, and wherein each of the plurality of energy consuming components is provided with an own list comprising priority information on at least energy production units from which energy can be requested, the method comprising:
  receiving from each energy consuming component, the list;
  determining whether there is a conflict in priorities between received lists with regards to the listed energy production units, based on requests received from each of the energy consuming components;
  resolving said conflict when there is a conflict in priorities; and
  sending resolution information to each of the plurality of energy consuming components involved in said conflict of the energy production unit to use as an energy source, wherein the resolution information enables each of the plurality of energy consuming components to request energy from the energy production unit as the energy source.

7. The method according to according to claim 6 wherein resolving said conflict is performed according to a first in first out principle.

8. The method according to claim 6 wherein resolving said conflict is performed time-wise with equal priority.

9. The method according to claim 6 wherein resolving said conflict is performed by overriding conflicting priorities and informing each of the plurality of energy consuming components involved in the conflict to use currently available own production energy unit as energy supply.

10. The method according to claim 6 wherein determining whether there is a conflict in priorities comprises determining when the requests from two or more energy consuming components are identical in that the priority lists of the energy consuming components involved in the conflict are similar.

* * * * *